Jan. 13, 1948.     D. READ, JR     2,434,434
HYDROCARBON CONVERSION
Filed Jan. 10, 1945
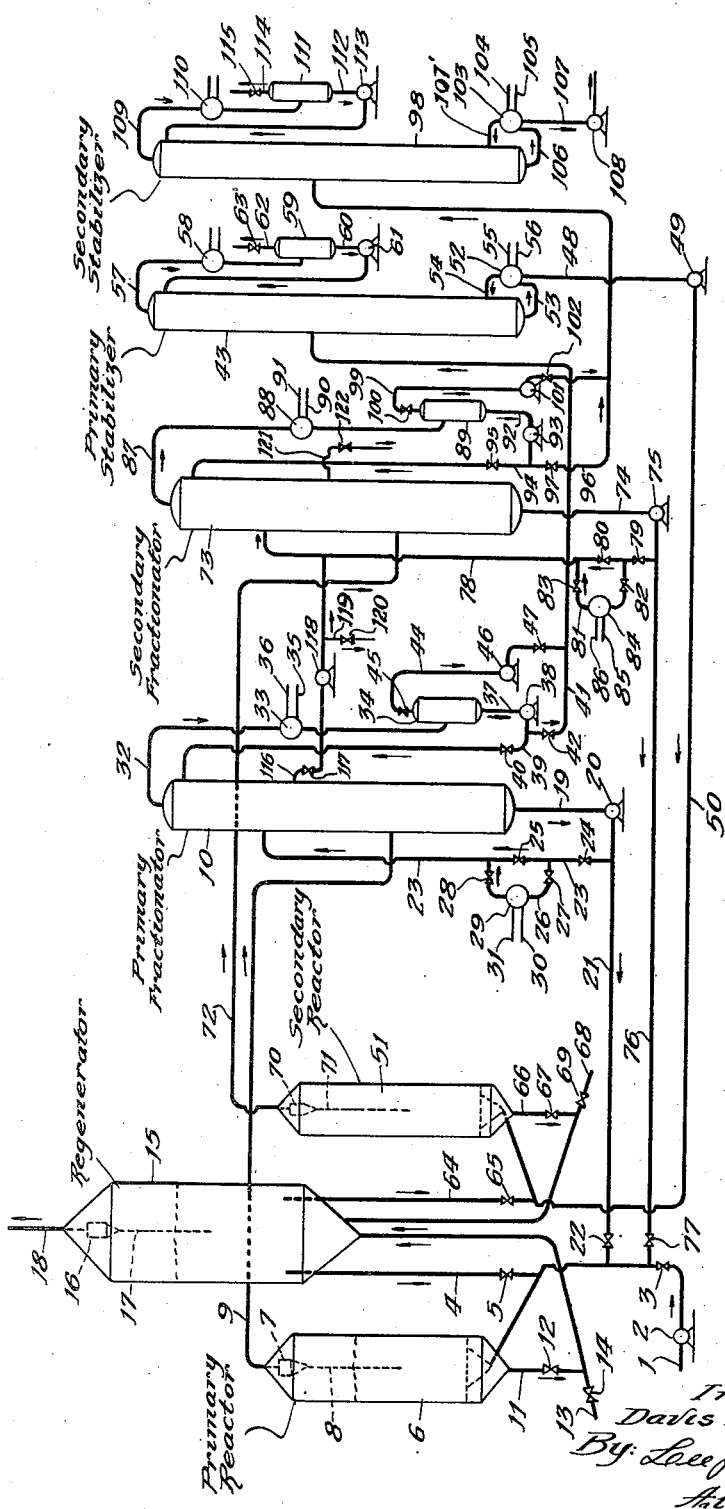
Inventor:
Davis Read Jr.
By Lee J. Gary
Attorney Patented Jan. 13, 1948

2,434,434

UNITED STATES PATENT OFFICE 2,434,434

HYDROCARBON CONVERSION

Davis Read, Jr., La Grange, Ill., assignor to Universal Oil Products Company, Chicago, Ill., a corporation of Delaware Application January 10, 1945, Serial No. 572,205

3 Claims. (Cl. 196—49)

This invention relates to an improved process for the conversion of hydrocarbons, and more particularly, to an improvement in the fluidized catalyst cracking of hydrocarbon oils to produce high antiknock motor fuels.

It has been found that high yields of high grade aviation gasoline can be produced by the two-stage processing of hydrocarbon oils in a fluidized catalyst cracking system. In these units it is customary to employ two cracking reactors in conjunction with a common regenerator. The catalyst is circulated between the regenerator and the two reactors by means of fluid streams, for example, air or regenerating gas is used for transporting catalyst in the direction of the regenerator and incoming reactants are used for transporting catalyst into the reactors. The catalyst most commonly employed in this type of process is a finely divided material comprising silica and alumina which has been ground or powdered to a particle size which includes a sizable portion having a diameter of less than 40 microns. The balance of the material ranges upwardly in size but in general all of the particles will pass through a 40 mesh sieve.

In the reactors the vaporized reactant stream passes upwardly through the mass of catalyst particles and maintains it in a turbulent condition resembling a boiling liquid. The reaction products leave the mass and pass through cyclone separators wherein the major portion of any entrained catalyst is removed and returned to the catalyst bed in the reactor. The reaction products containing residual entrained catalyst particles then passes into fractionation equipment. In the fractionation equipment the catalyst particles accumulate in the bottoms stream and it is common practice to recycle this stream back to the reactor. In conventional systems of this type using two stages of cracking it is customary to return the recycle stream containing catalyst particles to the reactor from which the catalyst was originally carried in the effluent reactant stream. For instance, in a two-stage process the products from the primary reactor, the reactor cracking the raw oil, pass into the primary fractionator and the recycle bottoms containing catalyst are returned to the primary reactor. Likewise, the products from the secondary reactor, which treats gasoline boiling range materials produced in the primary reactor and separated in the primary fractionator, are passed into the secondary fractionator and the bottoms containing entrained catalyst are returned to the secondary reactor.

I have found that if the bottoms from the secondary fractionator containing entrained catalyst are returned to the primary reactor instead of the secondary reactor that an improvement in product quality is realized. This improvement is appreciable and is of considerable importance when the plant is operating to produce aviation base stock.

In one specific embodiment the present invention consists of a multiple stage fluidized catalyst cracking process which comprises treating a hydrocarbon oil in a first fluidized catalyst cracking stage, separating the resultant products to recover a gasoline boiling range material, directing the latter into a second fluidized catalyst cracking stage for treatment therein, separating the products from said second fluidized catalyst cracking stage to recover aviation base stock and a higher boiling material containing entrained catalyst particles, and returning the higher boiling material containing catalyst particles to said first fluidized catalyst cracking stage for treatment therein.

The conditions of operation which are preferred for the different steps of the process are as follows:

In the primary or No. 1 reactor temperatures of the order of 800–1050° F. with atmospheric or superatmospheric pressures, weight hourly space velocities of from 0.1 to 5, and catalyst to oil ratios of from 1 to 15. In the No. 2 reactor slightly lower temperatures are generally preferred being of the order of 700–1050° F. with atmospheric or superatmospheric pressures, weight hourly space velocities of from 0.5 to 10, and catalyst to oil ratios of from 1 to 30. The regenerator is preferably operated at about 1100° F., although temperatures of from 900–1200° F. may be employed. Any conventional cracking catalyst of appropriate size may be employed. The preferred catalyst comprises synthetic silica and alumina composites.

In order to more clearly illustrate the features and advantages of the invention, the accompanying diagrammatic drawing and following description thereof are included in this specification.

The drawing is a schematic flow diagram of a two-stage fluidized catalyst cracking system embodying the features of the present invention.

A hydrocarbon oil is introduced through line 1 and pump 2 and is controlled by valve 3. The charge commingled with hot regenerated catalyst from line 4 controlled by valve 5 enters primary reactor 6. The reaction products from reactor 6 pass through cyclone 7 wherein the major portion of entrained catalyst particles is removed and returned to the catalyst bed by means of line 8. The separated hydrocarbon reactants containing residual entrained catalyst are then directed through line 9 into primary fractionator 10.

The spent catalyst from reactor 6 is withdrawn through line 11 and valve 12, is commingled with air introduced through line 13 controlled by valve 14, and directed into regenerator 15 wherein the carbonaceous deposit is removed from the catalyst particles by combustion. The combustion products pass through separator 16 which removes the major portion of catalyst particles from the effluent stream and they are returned by means of line 17 to the catalyst mass in the regenerator. The combustion products leave the system through line 18 to be directed to suitable separation and recovery equipment for residual entrained catalyst particles.

The reaction products entering primary fractionator 10 are separated into a bottoms cut containing a slurry of catalyst which is withdrawn through line 19 and by means of pump 20, line 21, valve 22, and line 1 directed into reactor 6. A large portion of the material withdrawn through line 19 is directed through line 23 and valves 24 and 25 to one of the upper trays in fractionator 10. In most instances valve 25 will be closed and this stream will be directed by means of line 26 and valves 27 and 28 through heat exchanger 29. The coolant for heat exchanger 29 may comprise water or hydrocarbons and is supplied and removed therefrom by means of lines 30 and 31, respectively. The stream supplied to column 10 by means of line 23 functions to regulate the temperature within the column and remove and flush catalyst therefrom.

The top temperature of the column is generally maintained to give an overhead product having an end boiling point of about 400° F. This material is withdrawn through line 32 and passes through condenser 33 into receiver 34. Cooling water is supplied to and withdrawn from condenser 33 by means of lines 35 and 36, respectively. The condensed material separated in receiver 34 is withdrawn through line 37 and pump 38, one portion being directed by means of line 39 and valve 40 to the upper portion of fractionator 10 to act as reflux therefor. The other portion of the condensed material is directed through line 41 and valve 42 to primary stabilizer 43. The uncondensed material is removed from receiver 34 by means of line 44 and valve 45 compressed in compressor 46 and then passed through valve 47 to be commingled with the material flowing through line 41 into stabilizer 43.

In stabilizer 43 the lower boiling hydrocarbons, generally C₄ and lighter are removed and the stabilized gasoline boiling range material withdrawn through line 48 is directed by means of pump 49 and line 50 into secondary reactor 51.

Heat is supplied to primary stabilizer 43 by means of reboiler 52 which is connected thereto by means of lines 53 and 54. A suitable heating medium is supplied to and withdrawn from reboiler 52 by means of lines 55 and 56, respectively. The separated light hydrocarbons are removed from stabilizer 43 by means of line 57 and passed through condenser 58 into receiver 59. Condensed material is removed from receiver 59 and returned by means of line 60 and pump 61 to the upper portion of stabilizer 43 to act as reflux therefor. Uncondensed gases are removed from the system through line 62 and valve 63.

The gasoline boiling range material which is to be treated in secondary reactor 51 is commingled with hot regenerated catalyst passing through line 64 controlled by valve 65. The reactants pass upwardly through the catalyst particles in reactor 51 and maintain the mass of catalyst in a turbulent condition resembling a boiling liquid. The spent catalyst is removed through line 66 controlled by valve 67 and is commingled with air introduced through line 68 controlled by valve 69 and directed into regenerator 15 wherein the carbonaceous deposit is removed by combustion.

The reaction products are passed through separator 70 wherein the major portion of the entrained catalyst is removed and returned to the bed by means of line 71. The reaction products containing residual entrained catalyst are then directed through line 72 into secondary fractionator 73. In fractionator 73 the catalyst entrained in higher boiling hydrocarbons is separated from material boiling below the end boiling point of aviation base stock. The higher boiling catalyst-containing material is withdrawn through line 74 and pump 75 and returned through line 76 and valve 77 to be commingled with the raw oil in line 1 and undergo processing in primary reactor 6.

A large portion of the material withdrawn through line 74 is returned to the upper portion of fractionator 73 by means of line 78 controlled by valves 79 and 80. In most cases valve 80 will be closed and the recycle material will be directed by means of line 81 and valves 82 and 83 through heat exchanger 84. A suitable coolant is supplied to and withdrawn from heat exchanger 84 by means of lines 85 and 86, respectively. The stream directed into fractionator 73 by means of line 78 functions to remove heat from the fractionator and also flush catalyst therefrom.

The aviation base stock and lower boiling hydrocarbons are removed from fractionator 73 by means of line 87 and pass through condenser 88 into receiver 89. A suitable cooling medium is supplied to and removed from condenser 88 by means of lines 90 and 91, respectively. The condensed material is removed from receiver 89 by means of line 92 and pump 93. One portion of this material is directed through line 94 and valve 95 to the upper portion of fractionator 73 to act as reflux therefor. The other portion of the condensed material is directed through line 96 and valve 97 into secondary stabilizer 98. The uncondensed material is removed from receiver 89 by means of line 99 and valve 100. This material is compressed by means of compressor 101 and is then passed through valve 102 and commingled with the condensed material in line 96 with which it passes into secondary stabilizer 98.

Heat is supplied to stabilizer 98 by means of reboiler 103 to which a suitable heating medium is supplied by means of line 104 and from which the heating medium is withdrawn through line 105. Reboiler 103 is connected to stabilizer 98 by means of lines 106 and 107'. The stabilized aviation base stock is removed from the system by means of line 107 and pump 108. Lower boiling hydrocarbons are removed from stabilizer 98 by means of line 109 and pass through condenser 110 into receiver 111. Condensed material is withdrawn from receiver 111 by means of line 112 and pump 113 and directed to the upper portion of stabilizer 98 to act as reflux therefor. Uncondensed material is removed from receiver 111 by means of line 114 controlled by valve 115 and removed from the system.

In cases where insufficient higher boiling material is produced in the secondary reactor an intermediate fraction is withdrawn from fractionator 10 by means of line 116, valve 117 and pump 118 and passes into fractionator 73 with the recycle stream in line 78.

Intermediate boiling range material from the primary and secondary cracking stages may be withdrawn from the plant respectively through line 119 and valve 120 and line 121 and valve 122.

To further illustrate the utility of the present invention, the following example is included in this specification:

Example

A plant similar to that just described has been operated in a manner such that the bottoms containing catalyst from the secondary fractionator were in one case returned to the secondary reactor and in another case to the primary reactor. The conditions of operation in both cases were substantially the same, the primary reactor being maintained at about 945° F. with a weight hourly space velocity of about 1.1 and a catalyst to oil ratio of about 7, and a pressure of 6 pounds per square inch gage. The secondary reactor was operated at about 890° F., weight hourly space velocity of about 0.76, catalyst to oil ratio of about 16, and a pressure of about 5 pounds per square inch gage. The yield of depentanized aviation base stock was substantially the same in both cases, being about 17.4 volume per cent based on the charging material. In the one case, however, where the secondary fractionator bottoms were returned to the secondary reactor the 1-C rating of the aviation base stock with 4.6 cc. of tetraethyl lead was 89.8. In the other case where the secondary fractionator bottoms were returned to the primary reactor, the aviation base stock had a rating with 4.6 cc. of tetraethyl lead of 91.2.

I claim as my invention:

1. A two-stage fluidized catalyst cracking process which comprises treating a hydrocarbon oil in a first fluidized catalyst cracking stage, fractionating the resultant product containing entrained catalyst particles to recover a gasoline boiling range material, intermediate boiling range material and a higher boiling range material containing said entrained catalyst particles, returning the latter to said first fluidized catalyst cracking stage, directing the gasoline boiling range material to a second fluidized catalyst cracking stage for treatment therein, fractionating the products containing entrained catalyst particles from said second fluidized catalyst cracking stage together with said intermediate boiling range material to recover a gasoline boiling range fraction and a higher boiling material containing the entrained catalyst particles, and returning said last named material to said first fluidized catalyst cracking stage.

2. In a two-stage cracking process employing a subdivided solid cracking catalyst wherein a hydrocarbon oil is cracked in a first stage, the resultant gasoline boiling range material is subjected to further treatment in a second stage, the bulk of the catalyst is separated from the reaction products of each stage, and the separated catalyst particles are returned to the reaction zones of their respective stages, the improvement which comprises introducing into a first fractional distillation column the first stage reaction products containing a relatively small amount of entrained catalyst not removed in the previous separation step, separating in said column a gasoline boiling range fraction, an intermediate boiling range material, and a slurry comprising a higher boiling fraction and said entrained catalyst, recycling said slurry to the reaction zone of said first stage, subjecting said gasoline boiling range fraction to reaction in said second stage, introducing into a second fractional distillation column the second stage reaction products containing a relatively small amount of entrained catalyst not removed in the previous separation step, also introducing said intermediate boiling range material into an upper region of said second column whereby to provide a liquid wash to assist in flushing catalyst particles to the bottom of the column, separating in said second column a gasoline boiling range product and a slurry comprising a higher boiling fraction and said last named entrained catalyst, recovering said gasoline boiling range product, and recycling said last named slurry to the reaction zone of said first stage.

3. The process of claim 2 further characterized in that said intermediate boiling range material is introduced to said second column at a point above the point of introduction of feed thereto.

DAVIS READ, Jr.

REFERENCES CITED

The following references are of record in the file of this patent:

UNITED STATES PATENTS

| Number | Name | Date |
|---|---|---|
| 2,235,133 | Zimmerman | Mar. 18, 1941 |
| 2,270,071 | McGrew | Jan. 13, 1942 |
| 2,328,325 | Butikofer | Aug. 31, 1943 |
| 2,345,128 | Korpi | Mar. 28, 1944 |
| 2,358,888 | Thomas | Sept. 26, 1944 |
| 2,361,891 | Watson | Oct. 31, 1944 |
| 2,283,854 | Friedman et al. | May 19, 1942 |
| 2,327,175 | Conn | Aug. 17, 1943 |